Patented Jan. 5, 1954

2,665,285

UNITED STATES PATENT OFFICE 2,665,285

STABILIZATION OF DERIVATIVES OF DITHIOCARBAMIC ACIDS

Rayner S. Johnson, New Castle, Del., assignor to E. I. du Pont de Nemours and Company, Wilmington, Del., a corporation of Delaware No Drawing. Application July 6, 1951, Serial No. 235,563

7 Claims. (Cl. 260—429)

This invention relates to stabilized derivatives of dithiocarbamic acid selected from the group consisting of salts of dialkyl dithiocarbamic acids and salts of alkylene bisdithiocarbamic acids, which group will be referred to hereinafter more briefly as derivatives of dithiocarbamic acid, and to methods for making such stabilized compositions. More particularly it relates to processes for stabilizing said derivatives of dithiocarbamic acid against decomposition by treating thos compounds with a sulfite.

This application is a continuation-in-part of my copending application Serial No. 95,155, filed May 24, 1949.

The derivatives of dithiocarbamic acid which are stabilized against decomposition by treatment with a sulfite in accordance with this invention are represented by the formula

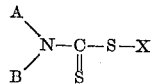

where A and B are both alkyl radicals (preferably less than 5 carbon atoms), or A is alkylene (preferably less than 7 carbon atoms) linking to the nitrogen atom of another dithiocarbamic acid radical to form an alkylene bisdithiocarbamate, and B is hydrogen; and X is a salt-forming element such as an alkali metal, an alkaline earth, or a heavy meal, or a salt-forming group.

The derivatives of dithiocarbamic acid which contain the group

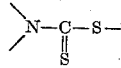

are known as a class to possess disinfectant properties and to be especially effective for the control of fungi. A wide variety of the derivatives of dithiocarbamic acid are disclosed and suggested in U. S. Patent Re. 22,750. U. S. 2,317,765 also shows a variety of derivatives of dithiocarbamic acid, specifically a number of salts of alkylene bisdithiocarbamic acid. Still other specific members of the class such as alkylene bis alkyl dithiocarbamates are disclosed in U. S. 2,384,577, and salts of hexamethylene dithiocarbamic acid are disclosed in U. S. 2,187,719.

Notwithstanding the unusual fungicidal properties of many of the derivatives of dithiocarbamic acid, the commercial use of the compounds has been limited because of their instability and the tendency of the group

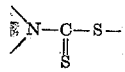

to decompose. As the compounds decompose, they develop an obnoxious odor. In some cases the instability of the compounds is so great that preparation, packaging, shipping or storing of the products is unsafe and impractical. Others though more stable are unsuitable for use as agricultural fungicides generally, because the solid decomposition products which remain are relatively non-toxic to fungi and appear sometimes to be phytocidal thus tending to injure or destroy many plants.

It is an object of this invention to provide stabilized derivatives of dithiocarbamic acid. Another object is to provide dithiocarbamic acid derivatives which do not become increasingly malodorous on aging. A still further object is to provide derivatives of dithiocarbamic acid which may be applied to plant seeds and to growing plants for the control of fungi without the danger of damaging the plant. Another object is to provide in a stable form a number of highly active dithiocarbamic acid derivatives which heretofore were too unstable to be of any practical commercial value for pest control use. It is an object also to provide methods for stabilizing dithiocarbamic acid derivatives. Other objects will become apparent hereinafter.

The foregoing and other objects of the invention are attained simply and effectively by mixing a dithiocarbamic acid derivative selected from the group consisting of a salt of a dialkyl dithiocarbamic acid and a salt of an alkylene bisdithiocarbamic acid with an inorganic sulfite.

Thru some mechanism which is not fully understood, the sulfite treatment serves to stabilize the group

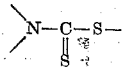

thus eliminating the normal tendency of the group to breakdown or decompose to give unwanted malodorous and phytotoxic materials.

The sulfite treatment can be carried out using any inorganic sulfite. By "inorganic sulfite" I mean an inorganic salt of sulfurous or hyposulfurous acid; in other words an inorganic sulfite, bisulfite or hyposulfite. The alkali metal and alkali earth metal compounds such as the sodium and calcium sulfites, bisulfites and hyposulfites, and the ammonium compounds such as ammonium sulfite, ammoninum bisulfite, and ammonium hyposulfiite, all water-soluble, are particularly well suited, but various other sulfites such as the zinc, iron, and manganese sulfites, bisulfites or hyposulfites are also effective stabilizers of dithiocarbamic acid derivatives. It will be understood, of course, that the inorganic sulfite can be formed in situ in carrying out the processes of the invention as by treating the dithiocarbamic acid derivatives with sulfur dioxide in the presence of an alkali.

A wide variety of techniques can be employed for effecting the sulfite stabilizing treatment, as long as the essential requirement that the dithiocarbamic acid derivative be subjected to the action or contact of an inorganic sulfite is observed. Thus in the case of water-soluble dithiocarbamic acid derivatives, solutions of such derivatives can be treated with sulfur dioxide in the presence of an alkali or with an inorganic sulfite, bisulfite or hyposulfite. Where the dithiocarbamic acid derivative to be treated is water-insoluble, an aqueous slurry or suspension of the compound can be treated with the sulfite. Alternatively, a water-insoluble dithiocarbamic acid derivative can be precipitated according to methods well-known in the art from a corresponding water-soluble derivative which has been previously treated with a sulfite.

Since the derivatives of dithiocarbamic acid are generally prepared in an aqueous medium, it is convenient and preferable from an economic standpoint to effect the sulfite treatment by mixing the sulfite and the dithiocarbamic acid derivative in the aqueous medium in which the dithiocarbamic acid derivative is being or has been prepared.

However instead of treating a solution of a water-soluble dithiocarbamic acid derivative or a suspension or slurry of an insoluble derivative in the liquid reacting mass in which the derivative is formed, other methods, generally requiring additional manipulative steps, can be used if desired. For example, the sulfite stabilizing treatment can also be effected by contacting a moist mass of a dithiocarbamic acid derivative, such as would be obtained as filter cake following a filtration operation, with a sulfite. Thus, a sulfite-containing liquid can be used to wash the filter cake obtained in a filtration operation. According to still another method, a dry dithiocarbamic acid derivative can be sprayed with an aqueous solution of a sulfite. The compositions of the invention can also be prepared by admixing a dry dithiocarbamic acid derivative with a dry inorganic salt of sulfurous acid (i. e., a sulfite or a bisulfite) or a dry inorganic salt of hyposulfurous acid, i. e., a hyposulfite).

The amount of sulfite required to stabilize dithiocarbamic acid derivatives will vary with the varying degrees of instability of the dithiocarbamic acid derivatives and one can by a few simple trials readily arrive at the amount required to stabilize any given compound. In general, it will be found sufficient to treat the dithiocarbamic acid derivative with an amount of an inorganic sulfite equivalent to from 0.001 to 0.5 part by weight of sulfite ion per part by weight of the dithiocarbamate radical

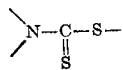

More preferably, the inorganic sulfite is used in the treatment in amount equivalent to from 0.1 to 0.5 part by weight of sulfite ion for each part by weight of the radical

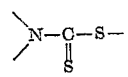

Of course, larger amounts of the sulfite can be used in preparing the compositions of the invention if so desired, but except in the case of unusually unstable compounds the larger amounts add little if anything to the stabilizing action.

In the processing of the dithiocarbamic acid derivative after treatment with an inorganic sulfite, as for example in the subsequent step of removing water when the sulfite treatment has been made in the aqueous medium, it is undesirable to remove all the sulfite radical from the composition. Thus the stabilized compositions of this invention, whether in the form of a dry solid or in solution, contain a mixture of a dithiocarbamic acid derivative and a minor amount of an inorganic sulfite. In general the treated compositions will contain an amount of sulfite equivalent to at least about 0.001 part by weight of sulfite ion for each part by weight of the dithiocarbamate radical

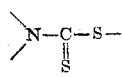

The invention will be more fully understood by reference to the following examples.

*Example I*

To 2360 parts by weight of an aqueous solution of sodium dimethyl dithiocarbamate containing a slight amount of free alkali, there was added a solution of 20 parts by weight of sodium hyposulfite in 4200 parts by weight of water. The mixture was stirred while slowly adding thereto a stoichiometric equivalent of a 10% aqueous solution of manganese sulfate (2467 parts by weight required) to form a slurry of insoluble manganese dimethyl dithiocarbamate in the aqueous mass. The slurry of manganese dimethyl dithiocarbamate was divided into two equal portions and the precipitate collected on separate filters. One filter cake was washed with 2000 parts by weight of a 1% sodium hyposulfite solution, then with 200 parts by weight of a 5% sodium hyposulfite solution, and then dried. The other filter cake was washed with 2000 parts by weight of a 2% sodium sulfite solution, then with 500 parts by weight of a 5% sodium sulfite solution, and dried.

The manganese dimethyl dithiocarbamate products made by this example were light yellow in color. Preparations which were made following the same procedure but without the use of the sulfite stabilizer turned dark brown upon drying and storage.

*Example II*

10 parts by weight of sodium bisulfite in 2000 parts by weight of water were added to 500 parts by weight of an aqueous solution of sodium ethylene bisdithiocarbamate containing a slight amount of free alkali. The resulting solution was treated with stirring with an equivalent of 10% zinc chloride solution (532 parts by weight required) and the resulting zinc ethylene bisdithiocarbamate precipitate was filtered off. The filter cake was washed with 1000 parts by weight of water, then with 1000 parts by weight of a 1% sodium bisulfite solution, and then dried. 101 parts by weight of the dried product was obtained.

The zinc ethylene bisdithiocarbamate, prepared according to this example, showed improved color properties, had much less odor, was exceedingly more stable and showed much less phytotoxicity than control samples which had been prepared without the use of a sulfite stabilizer.

Example III 1000 parts by weight of a 20% aqueous solution of sodium ethylene bisdithiocarbamate containing a slight amount of free alkali was concentrated by distillation of water therefrom at 20–25° C. under reduced pressure. Just before the charge began to solidify, the saturated solution of 2.5 parts by weight of sodium bisulfite was added. The remainder of the water in the charge was then removed by further distillation, leaving a white solid residue of sodium ethylene bisdithiocarbamate hexahydrate.

For comparison a solution of sodium ethylene bisdithiocarbamate which had not been treated with sodium bisulfite was evaporated to a solid residue under the same conditions. The two samples were analyzed for sodium ethylene bisdithiocarbamate and then placed in accelerated storage at 45–47° C. for 5 weeks. The material which had been treated with sodium bisulfite was unchanged by storage, while the untreated material showed a decrease of 20% in the sodium ethylene bisdithiocarbamate content.

Example IV

To 1000 parts by weight of sodium ethylene bisdithiocarbamate solution, there was added 3 parts by weight of 0.5% sodium sulfite solution. The mixture was treated with stirring at 35° C. with an equivalent of 10% ferric chloride solution (860 parts by weight required). The resulting ferric ethylene bisdithiocarbamate precipitate was collected on a filter, washed with 4000 parts by weight of 1% sodium bisulfite solution, and then dried. After grinding the dry salt, 207 parts by weight of product were obtained.

The ferric ethylene bisdithiocarbamate obtained in this example was black when first prepared and it remained black after drying and storage. In contrast, the product prepared without the sulfite stabilizer turned brown upon drying and storage. Additionally the stabilized product gave a pronounced improvement in fungicidal efficiency over the unstabilized material.

Example V 3000 parts by weight of an 0.5% aqueous solution of sodium sulfite was added to 1090 parts by weight of a 20% aqueous solution of sodium ethylene bisdithiocarbamate. To the resulting solution, there was added slowly with stirring 1409 parts by weight of a 10% aqueous solution of manganese sulfate at a temperature of 35° C. A precipitate of manganese ethylene bisdithiocarbamate formed and was filtered off. The filtered material was washed with 3000 parts by weight of a 1% sodium bisulfite solution and then with 1000 parts by weight of a 3% sodium bisulfite solution. The yield of the dry salt after grinding was 224 parts by weight.

The manganese ethylene bisdithiocarbamate of this example was light yellow colored. A dark tan colored product was obtained without the use of a stabilizer. The stabilized material also showed improved fungicidal efficiency.

Example VI

To 500 parts by weight of 21% sodium ethylene bisdithiocarbamate solution containing a slight amount of free alkali was added a solution of 5 parts by weight of sodium bisulfite in 1500 parts by weight of water. The mixture was treated with stirring at 30–35° C. with an equivalent of 10% zinc chloride solution (527 parts by weight required) to precipitate zinc ethylene bisdithiocarbamate in the aqueous mass. A suspension of 45 parts by weight of fuller's earth in 500 parts by weight of water was added to the aqueous mass with stirring. The solids were then removed by filtration, washed with 2000 parts by weight of a 1% sodium bisulfite solution and then dried. The dried product was ground to give 153 parts by weight of a free-flowing, stabilized, fungicidal dusting powder.

Example VII 0.25 part by weight of sodium sulfite was added to 100 parts by weight of a 21.5% aqueous solution of sodium ethylene bisdithiocarbamate and the mixture was agitated until the sodium sulfite had dissolved. The solution changed from a yellow color to almost colorless by this treatment.

The above sodium sulfite treated solution of sodium ethylene bisdithiocarbamate and a sample of the untreated sodium ethylene bisdithiocarbamate solution were placed in stoppered bottles in an oven at 70° C. for 48 hours. Analysis of the samples after this heat treatment showed no decrease in sodium ethylene bisdithiocarbamate content in the case of the sodium sulfite treated solution whereas the sodium ethylene bisdithiocarbamate content of the untreated solution had decreased by 11%.

Example VIII

To 1000 parts by weight of trimethylammonium dimethyl dithiocarbamate solution was added 2000 parts by weight of 1% sodium sulfite solution. The mixture was warmed to 50° C. and slowly treated with stirring at that temperature with an equivalent of 10% ferric chloride solution (810 parts by weight required) to precipitate ferric dimethyl dithiocarbamate. The precipitate was collected on a filter, washed with 3000 parts by weight of a 1% sodium bisulfite solution and then dried. The product of this example showed no decomposition after storage at 70° C. for 24 days.

Example IX

An aqueous solution of 25 parts by weight of sodium hyposulfite in 1500 parts by weight of water was added to 667 parts by weight of sodium ethylene bisdithiocarbamate solution. An aqueous solution of 10% manganese sulfate was added slowly with stirring to the resulting mixture to precipitate manganese ethylene bisdithiocarbamate. The precipitate was collected on a filter, washed with water, then with 500 parts by weight of a 2% sodium hyposulfite solution and then dried. 181 parts by weight of the dry salt were obtained.

The manganese ethylene bisdithiocarbamate of this example had a light yellow color as compared to the dark tan product which was obtained without the use of a sulfite stabilizer. The stabilized product of the example was found to be a more effective fungicide than unstabilized manganese ethylene bisdithiocarbamate.

Example X

To 500 parts by weight of trimethylammonium dimethyl dithiocarbamate solution containing a slight amount of free alkali, there was added a solution of 1500 parts by weight of 1% sodium bisulfite solution. To the resulting mixture, there was added slowly with stirring a stoichiometric equivalent amount of an aqueous solution of 10% manganese sulfate (457 parts by weight required) to precipitate manganese dimethyl dithiocarbamate. The precipitate was filtered, washed with 1000 parts by weight of a 1% sodium bisulfite solution, then with 500 parts by weight of 5% sodium bisulfite solution, and then dried.

The manganese dimethyl dithiocarbamate of this example was light yellow in color and remained so after drying and storage. Preparations of manganese dimethyl dithiocarbamate made in the absence of a sulfite stabilizer turned dark brown upon drying and storage.

Example XI

An aqueous solution of 2.5 parts by weight of sodium hyposulfite in 1500 parts by weight of water was added to 500 parts by weight of an aqueous solution containing 21% sodium ethylene bisdithiocarbamate. A stoichiometric equivalent amount of a 10% zinc chloride solution was slowly added to the mixture with stirring at 30-35° C. to form a slurry of zinc ethylene bisdithiocarbamate in the aqueous mass. A suspension of 45 parts by weight of fuller's earth in 500 parts by weight of water was added to the aqueous mass and the mass was then filtered to recover the insoluble materials. The filter cake was washed with 2000 parts by weight of 0.5% sodium hyposulfite solution and then dried. The dried product was ground to give 155 parts by weight of a free-flowing, stabilized, fungicidal dusting powder.

The product of this example had improved color properties, less odor, was markedly more stable, and less phytotoxic than the control products which were prepared without a sulfite stabilizer.

I claim:

1. A process for preparing a stabilized derivative of a dithiocarbamic acid selected from the group consisting of a salt of a dialkyl dithiocarbamic acid and a salt of an alkylene bisdithiocarbamic acid, which comprises mixing said dithiocarbamic acid derivative with a minor amount of an inorganic sulfite.

2. A process for preparing a stabilized derivative of a dithiocarbamic acid selected from the group consisting of a salt of a dialkyl dithiocarbamic acid and a salt of an alkylene bisdithiocarbamic acid, which comprises mixing said dithiocarbamic acid derivative with a minor amount of an inorganic sulfite in the presence of water.

3. A process for preparing stabilized zinc ethylene bisdithiocarbamate which comprises contacting said dithiocarbamate with an aqueous solution of a sodium sulfite and then, without removing all said sulfite compound from contact with the dithiocarbamate, drying the dithiocarbamate.

4. A composition of matter comprising a derivative of dithiocarbamic acid selected from the group consisting of a salt of a dialkyl dithiocarbamic acid and a salt of an alkylene bisdithiocarbamic acid, and a minor amount of an inorganic sulfite.

5. A composition of matter comprising a salt of dialkyl dithiocarbamic acid and a minor amount of an inorganic sulfite.

6. A composition of matter comprising a salt of an alkylene bisdithiocarbamic acid and a minor amount of an inorganic sulfite.

7. A composition of matter comprising zinc ethylene bisdithiocarbamate and a minor amount of a sodium sulfite.

RAYNER S. JOHNSON.

References Cited in the file of this patent

UNITED STATES PATENTS

| Number | Name | Date |
|---|---|---|
| 2,123,928 | Bousquet | July 19, 1938 |
| 2,150,475 | Winans | Mar. 14, 1939 |
| 2,187,467 | Stuart | Jan. 16, 1940 |